(12) United States Patent
Williams

(10) Patent No.: US 7,048,803 B2
(45) Date of Patent: May 23, 2006

(54) METHOD OF DISSOLVING SCALE

(75) Inventor: Benjamin D. Williams, Toledo, OH (US)

(73) Assignee: Jones-Hamilton Co., Newark, CA (US)

( * ) Notice: Subject to any disclaimer, the term of this patent is extended or adjusted under 35 U.S.C. 154(b) by 17 days.

(21) Appl. No.: 10/353,601

(22) Filed: Jan. 29, 2003

(65) Prior Publication Data

US 2004/0144402 A1    Jul. 29, 2004

(51) Int. Cl.
 *C23G 1/00* (2006.01)

(52) U.S. Cl. ............... 134/2; 134/3; 134/22.13; 134/22.14; 134/22.17; 134/22.19

(58) Field of Classification Search ............ 134/2, 134/3, 22.13, 22.17, 41, 28, 29, 22.14, 22.19
See application file for complete search history.

(56) References Cited

U.S. PATENT DOCUMENTS

| | | | |
|---|---|---|---|
| 4,708,207 A | 11/1987 | Kalfayan et al. | 166/295 |
| 4,713,119 A * | 12/1987 | Earhart et al. | 134/3 |
| 4,913,823 A | 4/1990 | Lipinski et al. | 210/699 |
| 4,970,278 A | 11/1990 | Komabashiri et al. | 526/62 |
| 5,045,211 A | 9/1991 | Hamilton | 210/697 |
| 5,146,988 A | 9/1992 | Paul | 166/312 |
| 5,190,656 A | 3/1993 | Paul et al. | 210/643 |
| 5,199,995 A | 4/1993 | Shoji et al. | 134/2 |
| 5,346,626 A | 9/1994 | Momozaki et al. | 210/701 |
| 5,360,065 A | 11/1994 | Falk | 166/250.05 |
| 5,458,860 A | 10/1995 | Morris et al. | 423/155 |
| 5,605,579 A * | 2/1997 | Distaso | 134/38 |
| 5,762,821 A * | 6/1998 | Tate | 252/180 |
| 5,821,211 A * | 10/1998 | Borah | 510/247 |
| 6,207,079 B1 | 3/2001 | Kmec et al. | 252/389.2 |
| 6,464,900 B1 | 10/2002 | Kmec et al. | 252/389.22 |

FOREIGN PATENT DOCUMENTS

CH    93588 A    11/1919
DE    694237 C    7/1940

* cited by examiner

*Primary Examiner*—Zeinab El-Arini
(74) *Attorney, Agent, or Firm*—MacMillan, Sobanski & Todd, LLC

(57) ABSTRACT

A method of dissolving scale comprises contacting the scale with a solution of an alkali metal bisulfate. Another method of dissolving scale comprises contacting the scale with a solution of an alkali metal bisulfate and a strong mineral acid. A further method of dissolving scale comprises contacting the scale with a solution of an alkali metal bisulfate and an inorganic oxidizer.

14 Claims, No Drawings

METHOD OF DISSOLVING SCALE

BACKGROUND OF THE INVENTION

This invention relates in general to methods of removing scale, and in particular to chemical methods of dissolving scale to remove it from the interior surfaces of processing equipment.

In many industrial processes, the buildup of scale on the interior surfaces of processing equipment is a significant problem. Materials such as alkaline metal salts precipitate out of the fluids being processed and form adherent deposits or scale on the surfaces of the equipment. For example, scale can form on the surfaces of evaporators, fermentors, and other equipment used in the manufacture of ethanol from corn. The buildup of scale can cause problems with heat transfer, fluid flow, and sanitation of the processing equipment.

Many different methods have been used for scale removal, including both physical and chemical removal methods. In the ethanol manufacturing industry, various mineral acids have been employed to dissolve the scale, sometimes in combination with caustic soda. To date, no universal and total solution to the scale problem has been uncovered. There is still a need for an effective and economical method of removing scale.

SUMMARY OF THE INVENTION

The present invention relates to a method of dissolving scale. For example, the method can be used to remove scale from an interior surface of processing equipment used for producing ethanol by fermentation of corn. The method comprises contacting the scale with a solution of an alkali metal bisulfate. In a preferred embodiment, the alkali metal bisulfate is sodium bisulfate. The scale is usually an alkaline earth metal compound, such as calcium sulfate, calcium carbonate, and/or calcium oxalate.

In another embodiment of the invention, the method comprises contacting the scale with a solution of an alkali metal bisulfate and a strong mineral acid. In a preferred embodiment, the mineral acid is nitric acid. The solution preferably contains from about 1% to about 20% alkali metal bisulfate and from about 1% to about 10% nitric acid by weight. Preferably, the solution is substantially noncorrosive to stainless steel.

In a further embodiment of the invention, the method comprises contacting the scale with a solution of an alkali metal bisulfate and an inorganic oxidizer. In a preferred embodiment, the inorganic oxidizer is ammonium nitrate. Preferably, the solution contains from about 2% to about 20% alkali metal bisulfate and from about 2% to about 20% inorganic oxidizer by weight.

Various advantages of this invention will become apparent to those skilled in the art from the following detailed description of the preferred embodiments.

DETAILED DESCRIPTION OF THE PREFERRED EMBODIMENTS

In the method of the invention, a scale is dissolved by contacting it with a solution of an alkali metal bisulfate. Any type of alkali metal bisulfate can be used in the method. Preferably, the alkali metal bisulfate is sodium bisulfate, potassium bisulfate, or a mixture thereof.

The sodium bisulfate is a sodium salt of sulfuric acid generally expressed as $NaHSO_4$ (CAS Reg. No. 7681-38-1). It is also known as sodium acid sulfate, sodium hydrogen sulfate, and bisulfate of soda. A preferred sodium bisulfate is the food grade sodium acid sulfate manufactured by Jones-Hamilton Co., Walbridge, Ohio. It has been certified as GRAS and it meets Food Chemicals Codex, 4th Edition Specifications. The sodium acid sulfate is a dry product comprising crystalline solid particles. The product includes sodium bisulfate in an amount of from about 91.5% to about 97.5% by weight and sodium sulfate in an amount of from about 2.5% to about 8.5% by weight.

The potassium bisulfate for use in the invention is a potassium salt of sulfuric acid generally expressed as $KHSO_4$ (CAS Reg. No. 7646-93-7). It is also known as potassium acid sulfate and potassium hydrogen sulfate.

The solution of the alkali metal bisulfate preferably contains from about 2% to about 50% alkali metal bisulfate by weight, more preferably from about 5% to about 20%, and most preferably from about 5% to about 10%.

The remaining portion of the solution includes a solvent. The solvent is usually water, although any other suitable solvent can be used.

In one embodiment of the method, the solution includes a strong mineral acid in combination with the alkali metal bisulfate. The strong mineral acids are those which dissociate substantially completely in aqueous solution, such as nitric acid, hydrochloric acid, sulfuric acid, perchloric acid, hydrobromic acid, hydroiodic acid, chromic acid, permanganic acid, or mixtures thereof.

Preferably, the strong mineral acid is nitric acid. The solution of the alkali metal bisulfate and the nitric acid preferably contains from about 1% to about 20% alkali metal bisulfate and from about 1% to about 10% nitric acid by weight, more preferably from about 5% to about 15% alkali metal bisulfate and from about 1% to about 5% nitric acid.

Preferably, the solution containing the alkali metal bisulfate and the nitric acid is substantially noncorrosive to the stainless steel used on the interior surfaces of processing equipment. The solution preferably has a corrosion rate of stainless steel of not more than about 0.025 inch/year, which is measured as described below in Experiment 3.

In another embodiment of the method, the solution includes an inorganic oxidizer in combination with the alkali metal bisulfate. Any suitable inorganic oxidizer can be used. Preferably, the inorganic oxidizer is ammonium nitrate.

The solution of the alkali metal bisulfate and the inorganic oxidizer preferably contains from about 2% to about 20% alkali metal bisulfate and from about 2% to about 20% inorganic oxidizer by weight, and more preferably from about 3% to about 10% alkali metal bisulfate and from about 3% to about 10% inorganic oxidizer.

The scale dissolving method of the invention can be applied to practically any type of scale, including scales formed by deposition of materials on surfaces, and scales formed by corrosion of surfaces. In one embodiment, the scale is an alkaline earth metal compound, particularly a calcium compound. More particularly, the scale may be calcium sulfate, calcium carbonate, and/or calcium oxalate.

The method can also be used to dissolve scale in practically any type of location, such as removing scale from practically any type of surface. In one embodiment, the method is used to remove scale from an interior surface of processing equipment, e.g., equipment used for producing ethanol by fermentation of grain (corn, barley or wheat). Such equipment includes evaporators, fermentors, and other equipment known to those in the industry.

The scale is contacted with the alkali metal bisulfate solution for a time and in a manner sufficient to dissolve the scale. The time of contact will depend on the type and amount of scale and the type of solution used. In some applications, the scale is contacted with the solution for a time of at least about one hour, and preferably at least about two hours.

The scale can be contacted with the alkali metal bisulfate solution by any suitable method, such as by spraying the solution on the scale, or by soaking the scale in the solution. The solution can also be added to the materials being processed in processing equipment. In one embodiment of the method, the solution is introduced into the interior of processing equipment through a clean-in-place system connected to the equipment. The clean-in-place system usually includes a tank to hold the solution, a pump, and connecting conduits between the tank and the equipment.

Experiment 1

Three samples of scale were obtained from various ethanol plants. A brown, flat scale was obtained. Two samples, one a chunk scale (evaporator) and the other an off white flat scale (fermentor), were obtained from Commercial Alcohol Inc., Tiverton, Ontario, Canada.

In an effort to understand the effect of SBS concentration on scale removal, samples of the off-white fermentor scale were treated in three concentrations of SBS solution. The samples were dried at 103° C. for 30 minutes, cooled in a desiccator for 30 minutes and then immediately weighed, then placed in solutions of 10%, 25% and 40% SBS (w/w) at 170° F. for 2 hours. At the end of the 2 hours the samples were carefully dried, cooled and weighed. Table I summarizes the results of these tests.

TABLE I

SBS Concentration Study

| Test Protocol | % Loss Off-White | Sample Wt. Initial (g) | Sample Wt. Final (g) |
|---|---|---|---|
| 10% SBS/2 Hours | 52.3% | 0.0946 | 0.0451 |
| 25% SBS/2 Hours | 17.2% | 0.1323 | 0.1096 |
| 40% SBS/2 Hours | 0.0% | 0.0924 | 0.0958 |
| Ave. | 23.2% | 0.1064 | 0.0835 |

From the data in Table I we can see that the most effective SBS concentration appears to be 10%. To confirm that this is a valid result, 3 more samples of off-white scale were tested in 10% SBS. The samples were dried, cooled and weighed by the standard method, and treated at 170° F. for 2 hours. The results in Table II prove to be consistent with the initial results. In fact the 10% solution provided an average of 65.6% in weight loss.

TABLE II

10% SBS/Off-White Scale

| Test Protocol 10% SBS/2 Hours | % Loss Off-White | Sample Wt. Initial (g) | Sample Wt. Final (g) |
|---|---|---|---|
| Sample I | 56.8% | 0.1006 | 0.0435 |
| Sample II | 78.2% | 0.1082 | 0.0236 |
| Sample III | 61.9% | 0.1505 | 0.0573 |
| Ave. | 65.6% | 0.1198 | 0.0415 |

Table III summarizes the results for 5% SBS. Treating three samples of off-white scale in a 5% SBS solution provided an average of 69.9% weight loss. It appears that 5% SBS is the most of effective of all the concentrations tested thus far.

TABLE III

5% SBS/Off-White Scale

| Test Protocol 5% SBS/2 Hours | % Loss Off-White | Sample Wt. Initial (g) | Sample Wt. Final (g) |
|---|---|---|---|
| Sample I | 66.6% | 0.1080 | 0.0361 |
| Sample II | 70.6% | 0.1206 | 0.0355 |
| Sample III | 72.7% | 0.1112 | 0.0304 |
| Ave. | 69.9% | 0.1133 | 0.0340 |

Since 5% SBS seems to be the best operating concentration for this test, the test was run on the other two scale sample types. The same drying and testing procedure was followed and the results of these tests are summarized in Tables IV and V.

TABLE IV

5% SBS/Brown Scale

| Test Protocol 5% SBS/2 Hours | % Loss Brown | Sample Wt. Initial (g) | Sample Wt. Final (g) |
|---|---|---|---|
| Sample I | 33.6% | 0.2672 | 0.1774 |
| Sample II | 32.3% | 0.3183 | 0.2124 |
| Sample III | 36.6% | 0.3089 | 0.1957 |
| Ave. | 34.2% | 0.2966 | 0.1952 |

TABLE V

5% SBS/Chunk Scale

| Test Protocol 5% SBS/2 Hours | % Loss Chunk | Sample Wt. Initial (g) | Sample Wt. Final (g) |
|---|---|---|---|
| Sample I | 14.8% | 0.6220 | 0.5300 |
| Sample II | 28.5% | 0.4515 | 0.3228 |
| Sample III | 23.1% | 0.5280 | 0.4060 |
| Ave. | 22.1% | 0.5338 | 0.4196 |

The testing performed on the chunk scale shows a range of results. The samples taken from the chunk scale were not consistent. Some had a larger crystal chunk, while others appeared to have a larger organic build. The samples were selected to be as consistent as possible, but it is not possible to get three identical samples.

It appears that the easiest scale to remove would be the off-white, followed by the brown then the chunk. If 5–10% SBS solution was routinely injected into a clean plant, it is possible that the scale could be removed as it forms, preventing the scale from building up. This would eliminate the need for a clean-in-place (CIP) system and reduce or eliminate the need for shutdown cleaning.

Experiment 2

Ethanol manufacturers would like to find a cost effective way to eliminate or reduce the buildup of scale in their plants. It is believed that the scale is a combination of calcium sulfate, calcium carbonate and/or calcium oxalate (CaOx). We have proposed that sodium bisulfate can dissolve all three forms of scale. Adding a solution to the product stream is not preferred because this would add additional water to the process. Alternatively, it was decided to test the effect of SBS dissolved in the thin stillage (the process stream immediately before the evaporator). A 5-gallon sample of stillage was obtained for testing. The stillage is high in solids, so the material must be filtered prior to use.

A piece of chunk scale (evaporator) was dried/weighed and divided into three samples. Each of these samples was subjected to 2 hours in a 5% SBS solution made from filtered stillage. It should be noted that the pH of stillage as received is 4.15 and drops to 1.6 with addition of 5% SBS. As shown in Table VI, the average % loss was 21.1%, very close to the average of 22.1% in 5% SBS (aq). This leads us to the conclusion that reasonable results can be obtained using water or adding the SBS directly to the stillage.

TABLE VI

Chunk Scale in 5% SBS Diluted in Thin Stillage

| Test Protocol 5% SBS/2 Hours | % Loss Chunk | Sample Wt. Initial (g) | Sample Wt. Final (g) |
|---|---|---|---|
| Sample I | 22.3% | 0.2462 | 0.1914 |
| Sample II | 24.7% | 0.4940 | 0.3720 |
| Sample III | 16.5% | 0.3183 | 0.2659 |

To determine if this result would hold true for other scale types, three samples of brown scale were tested as above. As shown in Table VII, the % loss was 16% in 5% SBS/stillage as compared to better than 30% in 5% SBS (aq). The samples from this test were dried and subjected to the conditions a second time in a freshly prepared solution, and the sample again lost approximately 16%. The total % average loss for the two cycles was 29.5%, close to the average in 5% SBS (aq). These results suggest that an aqueous solution would perform better than direct addition to thin stillage.

TABLE VII

Brown Scale in 5% SBS Diluted in Thin Stillage

| | % Loss Brown | Sample Wt. Initial (g) | Sample Wt. Final (g) |
|---|---|---|---|
| Test Protocol 5% SBS/2 Hours | | | |
| Sample I | 17.0% | 0.4613 | 0.3828 |
| Sample II | 14.6% | 0.4942 | 0.4220 |
| Sample III | 16.4% | 0.4698 | 0.3926 |
| Ave. | 16.0% | | |
| (Second Pass) 5% SBS/2 Hours | | | |
| Sample I | 16.1% | 0.3842 | 0.3222 |
| Sample II | 11.5% | 0.4230 | 0.3745 |
| Sample III | 12.9% | 0.3935 | 0.3426 |
| Ave. | 13.5% | | |
| Total Weight Loss (Ave.) % | 29.5% | | |

In order to determine the effect of increased temperature for the ability of SBS to remove scale, brown scale was treated in a 6% SBS solution at 200° F. After 3 hours approximately one-half of the scale was removed, as shown in Table VIII.

TABLE VIII

6% SBS Boil Out

| Test Protocol SBS 6%/200° F. | % Loss | Sample Wt. Initial (g) | Sample Wt. Final (g) | Time (hours) |
|---|---|---|---|---|
| Brown Scale | 40.7% | 0.4135 | 0.2450 | 3 hr |
| Brown Scale | 45.7% | 0.4594 | 0.2496 | 3 hr |
| Brown Scale | 56.9% | 0.3230 | 0.1392 | 3 hr |

The ethanol industry would prefer not to add additional water to their 10 process stream. Therefore, it would be advantageous to be able to remove scale using the existing thin stillage stream as the diluent, instead of water. A sample of thin stillage was obtained from Commercial Alcohol Inc. and used to make a 6% SBS solution. The result was that 31% of the scale sample was removed in 5 hours.

Next, it was decided to try a blend of SBS and nitric acid for removing scale. It was believed that nitric acid's oxidizing qualities would make it useful in removing scale, allowing it to oxidize the proteins in the organic material formed by the corn pulp in the stillage. It is this organic material that acts as a binder, making it more difficult to remove the scale. Nitric acid is also used in passivation, a process defined by ASTM A830 as "the removal of exogenous iron or iron compounds from the surface of stainless steel by means of chemical dissolution, most typically by treatment with an acid solution that will remove the surface contamination, but will not significantly affect the stainless steel itself." Furthermore they describe passivation as "the chemical treatment of stainless steel with a mild oxidant, such as a nitric acid solution, for the purpose of enhancing the spontaneous formation of the protective passive film." Not only would the nitric acid help to speed the scale removal without harming the stainless steel, it would actually protect the steel. A solution of 6% SBS and 1% nitric acid was chosen as a starting point. The results are shown in Table IX.

TABLE IX

SBS/Nitric Acid

| Test Protocol 6% SBS/1% Nitric | % Loss | Sample Wt. Initial (g) | Sample Wt. Final (g) | Time (hours) |
|---|---|---|---|---|
| Brown Scale | 94.6% | 0.2353 | 0.0127 | 6.0 hr |
| Chunk Scale | 53.7% | 0.3863 | 0.1790 | 6.5 hr |
| Brown Scale | 66.8% | 0.2725 | 0.0905 | 5.5 hr |
| Brown Scale | 56.2% | 0.3195 | 0.1399 | 5.5 hr |
| Brown Scale | 67.8% | 0.24742 | 0.0796 | 5.5 hr |
| Brown Scale | 63.0% | 0.57020 | 0.2108 | 6.0 hr |

The SBS/nitric blend showed very good results with over 90% removal of brown scale in initial tests. Further tests showed good results with over 60% removed in about 6 hours. Even chunk scale showed a substantial removal of 53.7% in over 6 hours.

This protocol using SBS and nitric acid was next tested in thin stillage. A new sample of thin stillage was obtained from Ethanol 2000, Bingham Lake, Minn. The starting pH of this stillage was 3.5, more than 0.5 lower than the stillage from Commercial Alcohol Inc. Table X shows that the SBS/nitric acid blend removed approximately 18–30% of both chunk and brown scale in 5–6 hours. The removal of scale was not increased if the stillage was filtered. It was theorized that the presence of the organic corn material might act as a buffer, thus reducing the ability of the acids to remove the scale. The results for SBS/nitric in thin stillage were similar to 6% SBS alone in thin stillage.

TABLE X

SBS/Nitric Versus SBS in Thin Stillage

| Test Protocol 6% SBS/Thin Stillage (Filtered) | % Loss | Sample Wt. Initial (g) | Sample Wt. Final (g) | Time (hours) |
|---|---|---|---|---|
| Chunk Scale | 18.6% | 0.5570 | 0.4532 | 5.0 hr |
| Brown Scale | 25.4% | 0.4687 | 0.3498 | 5.0 hr |
| 6% SBS/Thin Stillage (Unfiltered) | | | | |
| Brown Scale | 31.1% | 0.4208 | 0.2898 | 6.5 hr |

Due to the suspected 'buffering' action of thin stillage, tests were performed with increased SBS (10%) and nitric acid (2%). Brown scale was used and the tests were carried out in 3 different media: water and thin stillage (filtered and unfiltered). The tests in thin stillage were about one-half as effective as the test in water. The results are summarized in Table XI.

TABLE XI

10% SBS/2% Nitric Acid in Water and Thin Stillage

| Test Protocol 10% SBS/2% Nitric Acid | % Loss Brown | Sample Wt. Initial (g) | Sample Wt. Final (g) | Time (hours) |
|---|---|---|---|---|
| Water | 92.0% | 0.2712 | 0.0217 | 8.0 hr |
| Stillage, Filtered | 59.9% | 0.2863 | 0.1147 | 8.0 hr |
| Stillage, Unfiltered | 49.3% | 0.3046 | 0.1544 | 7.0 hr |

The results indicate that a clean-in-place system may be a better option than adding the SBS/nitric blend to the thin stillage. It can also be concluded that 5–10% SBS in combination with 1–2% nitric acid is very effective at removing scale.

Nitric acid is a strong oxidizing acid. A dry, inorganic oxidizer was tested in place of nitric acid to determine its effectiveness in oxidizing the organic material. Table XII shows that ammonium nitrate is just as effective as nitric acid in removing scale. Ammonium nitrate is dry and can be easily blended and stored with the alkali metal bisulfate. Additionally, ammonium nitrate is not corrosive to steel, including carbon steel.

TABLE XII

10% SBS/2% Ammonium Nitrate

| Test Protocol 10% SBS/2% Ammonium Nitrate | % loss | Sample Weight initial (g) | Sample Weight final (g) | Time (hours) |
|---|---|---|---|---|
| Brown Scale | 74.0 | 0.1914 | 0.0498 | 8.0 hr |

Experiment 3

The method of the invention can be employed in ethanol plants to remove scale buildup in process evaporator tubes and other process equipment. Most evaporators are made of stainless steel material, with 304 and 316 the most common alloy used. Previous work showed that SBS is noncorrosive on these steel alloys. An experiment was done to determine the corrosivity of an SBS/nitric acid blend on the same alloys.

A solution consisting of 10% SBS and 2% nitric acid was prepared, and divided equally among 4 beakers. The beakers were placed on a hot plate and the solutions heated to 170° F. A sample of 304SS was weighed and placed into 2 of the beakers and a sample of 316SS was weighed and placed into the other 2 beakers. The beakers were loosely covered to reduce evaporation over the test period. The metal was treated in this solution for a period of 48 hours. At the end of the test period the samples were rinsed, dried and reweighed to determine weight loss and corrosion rate. The data are summarized in Table XIII.

TABLE XIII

Corrosion Data for 304 and 316 Stainless Steels

| Alloy | % Loss | Initial Weight | Final Weight | Weight Loss (g) | Corrosion Rate (in/yr) |
|---|---|---|---|---|---|
| 316ss | 0.15 | 28.4614 | 28.4180 | 0.0434 | 0.01727 |
| 316ss | 0.13 | 28.2787 | 28.2432 | 0.0355 | 0.01413 |
| 304ss | 0.05 | 29.9696 | 29.9547 | 0.0149 | 0.00569 |
| 304ss | 0.05 | 29.7082 | 29.6946 | 0.0136 | 0.00519 |

The data show a minimal amount of weight loss over the 48-hour test period. A typical clean-in-place procedure would take approximately 8–10 hours, and therefore should show lower corrosion rates than those listed in Table XIII. The corrosion rate for 316ss is approximately three times higher than for 304; however, it is still low at an average rate of 0.015 inch per year. The results of these tests confirm that use of an SBS/nitric acid cleaning solution should not be significantly corrosive on stainless steel when used to remove calcium scale.

The principle and mode of operation of this invention have been explained in its preferred embodiments. However, it must be understood that this invention may be practiced otherwise than as specifically explained without departing from its spirit or scope.

What is claimed is:

1. A method of removing scale from ethanol processing equipment, comprising contacting the scale on an interior surface of ethanol processing equipment for producing ethanol by fermentation of grain with a solution of an alkali metal bisulfate, the solution containing from about 5% to about 50% alkali metal bisulfate by weight, the scale including a material selected from the group consisting of calcium sulfate, calcium carbonate, calcium oxalate, and mixtures thereof, and the scale further including organic material from the grain.

2. A method according to claim 1 wherein the alkali metal bisulfate is sodium bisulfate.

3. A method according to claim 1 wherein the scale is removed by introducing the solution through a clean-in-place system connected to the processing equipment.

4. A method according to claim 1 wherein the organic material functions as a binder in the scale.

5. A method of removing scale from ethanol processing equipment, comprising contacting the scale on an interior surface of ethanol processing equipment for producing ethanol by fermentation of grain with a solution of an alkali metal bisulfate and nitric acid, the solution containing from about 5% to about 50% alkali metal bisulfate and from about 1% to about 10% strong mineral acid by weight, the scale including a material selected from the group consisting of calcium sulfate, calcium carbonate, calcium oxalate, and mixtures thereof, and the scale further including organic material from the grain.

6. A method according to claim 5 wherein the solution is substantially noncorrosive to stainless steel as measured by a corrosion rate of not more than about 0.025 inch/year.

7. A method according to claim 5 wherein the alkali metal bisulfate is sodium bisulfate.

8. A method according to claim 5 wherein the strong mineral acid is nitric acid.

9. A method according to claim 5 wherein the solution contains from about 5% to about 10% alkali metal bisulfate and from about 1% to about 2% strong mineral acid by weight.

10. A method according to claim 5 wherein the organic material functions as a binder in the scale.

11. A method of removing scale from ethanol processing equipment, comprising contacting the scale on an interior surface of ethanol processing equipment for producing ethanol by fermentation of grain with a solution of an alkali metal bisulfate and inorganic oxidizer, the solution containing from about 2% to about 20% alkali metal bisulfate and from about 2% to about 20% inorganic oxidizer by weight, the scale including a material selected from the group consisting of calcium sulfate, calcium carbonate, calcium oxalate, and mixtures thereof, and the scale further including organic material from the grain.

12. A method according to claim 11 wherein the alkali metal bisulfate is sodium bisulfate.

13. A method according to claim 11 wherein the inorganic oxidizer is ammonium nitrate.

14. A method according to claim 11 wherein the organic material functions as a binder in the scale.

* * * * *